March 31, 1953 R. L. McILVAINE 2,633,018
APPARATUS FOR MEASURING MOISTURE
Filed June 11, 1948 2 SHEETS—SHEET 1
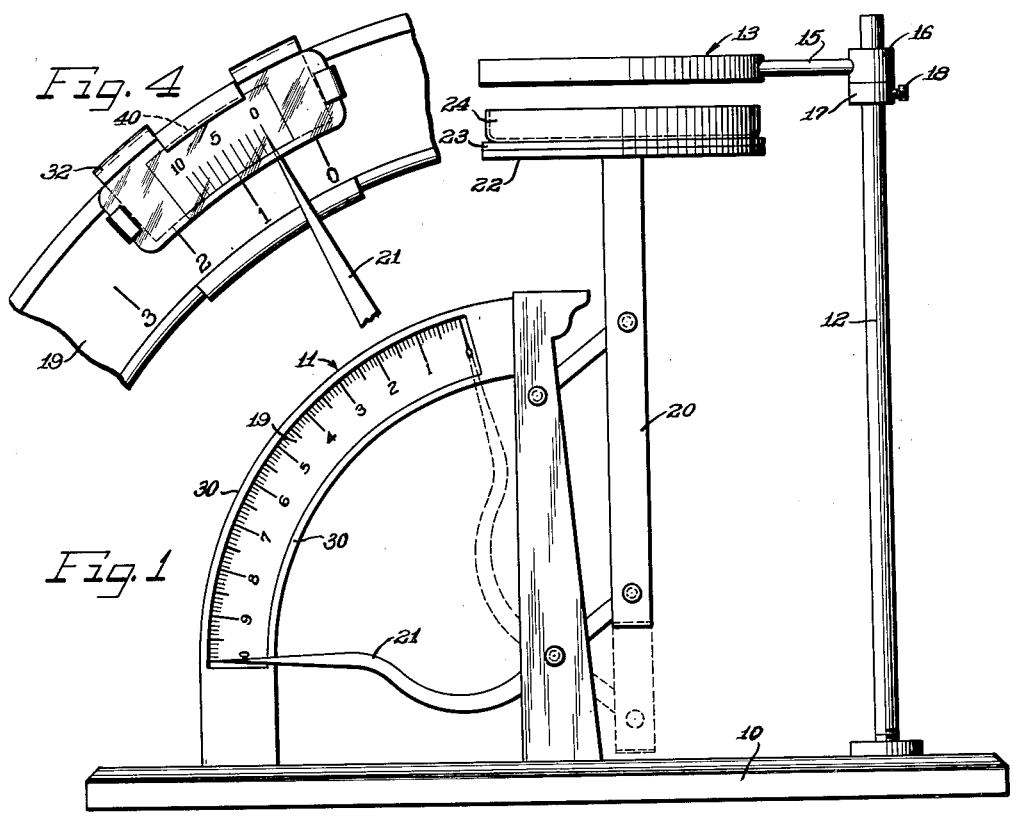
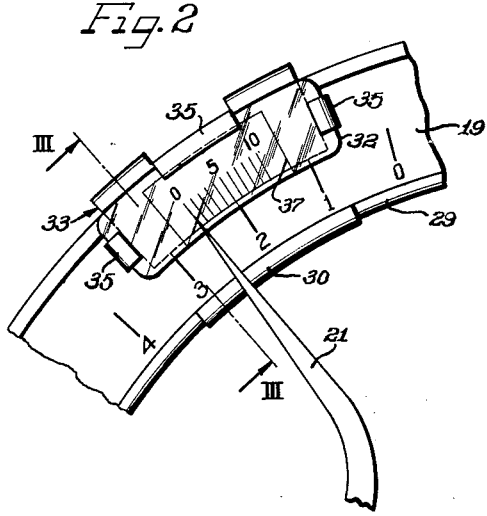
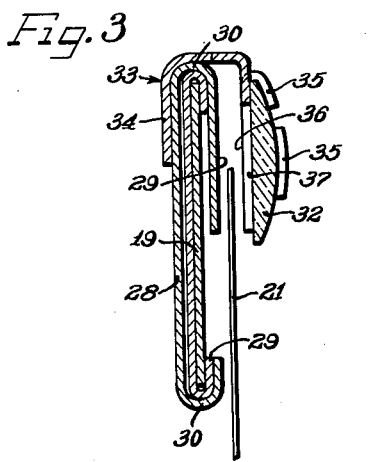
Inventor
Robert L. McIlvaine
By The Firm of Charles W. Hills Attys

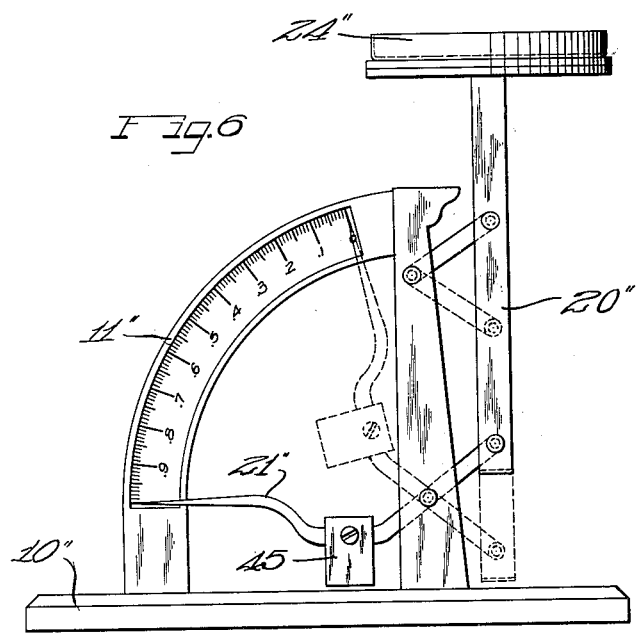
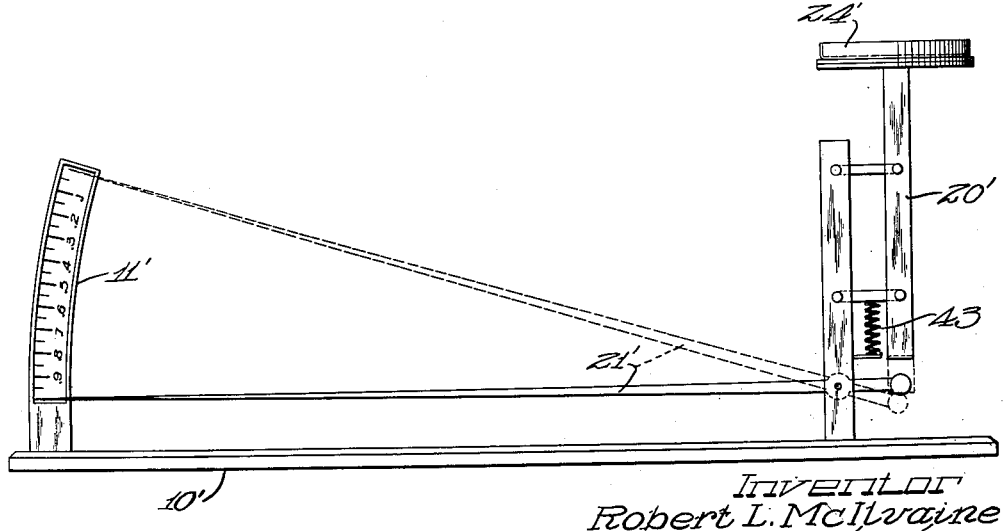

Patented Mar. 31, 1953

2,633,018

UNITED STATES PATENT OFFICE 2,633,018

APPARATUS FOR MEASURING MOISTURE

Robert L. McIlvaine, Glencoe, Ill., assignor, by mesne assignments, to Herbert Simpson Corporation, Chicago, Ill., a corporation of Illinois Application June 11, 1948, Serial No. 32,407

1 Claim. (Cl. 73—76)

This invention relates to a novel means for determining the amount of moisture in a given material. More particularly this invention has to do with apparatus for measuring the percent of moisture in a quantity of sand or the like by evaporating the moisture from the sand and recording the decrease in weight as the moisture is evaporated.

In preparing a mold, it is necessary to add water to the sand to give it the required molding characteristics. Sand that does not have enough moisture tends to crumble while sand that is too wet causes the formation of cavities that effect the soundness of the casting and may possibly cause the mold to explode.

In any foundry, therefore, there is need for a device by which the percent of moisture in a batch of sand can be quickly and accurately determined. This device should preferably be small and compact since space in a foundry is at a premium.

Since foundry sand is mixed in large batches, it is evident that the amount of moisture in the entire batch cannot be measured directly in any efficient manner. However, since the sand is thoroughly mixed before it is ready for use, a representative small sample of the sand may be used in carrying out a moisture determination and the results so obtained will be an accurate indication of the amount of moisture in the total batch.

It is, therefore, an object of this invention to provide means for quickly and accurately determining the moisture content of foundry molding sand or other material of similar nature.

Another object of this invention is to provide a small, portable apparatus that is adapted to accurately measure the amount of moisture in a small, representative sample of the batch of sand being processed.

According to the general features of this invention there is provided a small sensitive scale having a shallow container on the platform of the scale adapted to receive 10 grams of sand. The dial of the scale may be conveniently divided into ten major portions with each portion divided into ten subdivisions and so related to the scale mechanism that the indicating hand will read 10 grams when the pan is empty and will read zero when the pan contains 10 grams of the sand. A heating means is positioned adjacent the sand in the scale pan which is operative for quickly bringing the temperature of the sample to the evaporating temperature of the moisture in the sand whereby the moisture will be driven off and the percent moisture in the sample will be recorded on the scale by the movement of the indicating hand away from the zero point.

A feature of this invention is the provision of a heating means which may be quickly adjusted relative to the sample.

Another feature of this invention is the provision of means for magnifying the dial on the scale for facilitating accurate reading thereof.

Other and further features, objects and advantages of the present invention will be apparent to those skilled in the art from the following detailed description taken in connection with the annexed sheet of drawings.

Figure 1 is a front elevational view of the heating means and the scale means of the present invention assembled on a support platform.

Figure 2 is a fragmentary front elevational view of a modified form of the scale which is adapted to be used in the present invention.

Figure 3 is a sectional view taken on line III—III of Figure 2 looking in the direction indicated by the arrows.

Figure 4 is a fragmentary front elevational view of a modified form of the scale of this invention.

Figure 5 is a front elevational view of a modified scale constructed according to the teachings of the present invention.

Figure 6 is a front elevational view of another modified form of scale of this invention.

As shown on the drawings:

In Figure 1, the reference numeral 10 indicates generally a base structure on which is disposed a scale 11 and an upright support rod 12 secured by any suitable means in said base. A heating element 13 is supported substantially over the scale 11 at the end of a rod 15 which has a collar portion 16 disposed around the rod. An adjustment collar 17 is secured to the rod 12 by a set screw 18 and is effective to regulate the height of the heating element relative to the scale and to the base structure.

The heating element may be any suitable type which emits a considerable amount of radiant heat such as an electric heating unit or a piece of metal previously heated to a red heat by means of a gas flame or other heating means.

The scale 11 may be of any commercial type that is small and has a sensitive mechanism such as a postal scale with a dial 19 having a full scale reading of approximately 10 grams, each gram divided into 10 subdivisions. As will be noted in Figure 1 the plunger 20 of the scale moves downwardly under load and therefore the indicating arm 21 will read 10 grams when the scale is unloaded and will read zero grams when the scale has 10 grams disposed thereon.

On top of the scale platform 22 there is provided an insulating pad 23 of any suitable material, such as asbestos. A light, shallow container 24 is removably disposed on the pad 23. To measure the percent of moisture in a batch of sand, a representative sample of the sand is lightly placed in the shallow container 24 on the scale in increasing amounts until the indicating hand 21 reaches the zero reading. It will be understood, of course, that the scale has been previously adjusted to read 10 grams with the pad 23 and the container 24 on the platform of the scale.

The heating element is then swung into position directly over the material in the container and the material is very quickly heated to above 212° by radiation and convection with the result that the material is dried within a very few seconds thus lightening the load on the scale. The indicating hand will, therefore, move down in the scale from the full load zero position to a position which indicates the percent of moisture that was in the sample on the scale container. Thus, if the indicating hand stopped at the one gram reading it would indicate that a tenth of the total weight of the sample has been removed from the scale and therefore the sample contained 10% moisture. Since the scale is divided into 100 divisions the readings will give a direct reading of percentage.

Figure 2 illustrates a modified form of the apparatus of this invention. Since the scale has been divided into 100 divisions and each division therefore indicates one percent moisture in the sand, it might be difficult to accurately estimate the reading between adjacent one percent graduations. In this modification therefore there is provided a sliding scale 28, as shown in Figure 3, having flange members 29 arranged to hook around the edges 30 of the dial 19 of the scale 11. The sliding scale 28 may therefore be slid along the marginal edge of the dial portion of the scale. The scale 28 is substantially longer than the distance between one division on the large dial of the scale 11 and has a portion calibrated from zero to 10 which is exactly equal to the distance between one gram divisions as for instance between zero and 1, as indicated at Figure 2. Referring to Figure 2, after the indicating arm 21 stops after the evaporation of the moisture of the sample, as indicated in this figure, the sliding scale 28 is moved along the outer marginal edge of the main dial 19 until the zero of the scale 28 is directly opposite the indicating hand.

A magnifying glass 32, carried on a U-shaped frame 33, has a rear flange portion 34 hooked over and secured to the upper edge of the sliding scale 28 and a forward flange portion 36 overhanging the dial portion of the sliding scale 28 with the upper edge of the indicating arm 21 between the glass and the scale 28. This magnifying glass 32 is held on the frame 33 by tabs 35 bent out from the frame for engaging over the glass. A cutout portion 37 on the forward flange 36 permits the dial of the scale 28 to be read through the magnifying glass.

In Figure 2 the reading indicated thereon is 25%. The use of a sliding scale which is divided into one-tenth gram division obviates the necessity of calibrating the entire main dial 19 of the scale and also the magnifying glass 32 permits a more accurate reading of the one-tenth divisional mark.

In Figure 4 a further modification of the scale of this invention is illustrated. In this form the sliding magnifying glass 32 of Figure 2 is attached to a scale 40 which has a one gram division calibrated in $\frac{1}{10}$ gram subdivisions. In operation, if the operator, through inadvertence or due to the texture of the wet sand, fails to bring the indicator arm 21 exactly up to the zero mark on the fixed scale 19, the magnified sliding scale 40 is moved before the heating of the sand is begun to a point where the zero of scale 40 is aligned with the indicator arm 21.

By use of this sliding scale 40 the percent of error in any moisture determination can be greatly reduced. For example, supposing, by mistake, only 9.5 grams of certain moisture content is put on the pan of the scale instead of the 10 grams required to bring the indicator arm to zero. The arm will then indicate 0.5 of a gram and, if evaporation is begun then, the final moisture content reading will have a 5% error due to the initial 5% reading. However, if the sliding scale 40 is used and the zero of the scale is aligned with the indicating arm before the evaporation of moisture is begun, the scale will record the actual percent of moisture evaporation. The error due to the 9.5 gram load will then be reflected, not directly in percent of moisture, but in the same ratio as total weight of sand to reduction in weight.

A still further modification of the scale of this invention may be so adjusted that in reality the range of the indicating hand would be only one gram for the entire scale. This would mean that as the ten grams of sand were placed on the scale, the hand would remain off the dial until nine grams had been added and would only move over the surface of the dial between the ninth and tenth gram, coming to rest at zero when exactly ten grams had been placed in the container. This, each main divisional mark on the main dial of the scale would record one-tenth of a gram. Thus, the percentage of moisture could be measured accurately to much less than one percent.

This type of scale could be effected in many ways as by displacing the plunger 20, Fig. 5, away from the lower pivoted end of the indicating hand 21' of the scale 11' so that upon sand being deposited in the pan on top of the scale the plunger would move down against the action of a calibrated spring 43 until at exactly nine grams it would come in contact with the end of the indicating arm and would from there on indicate the weight of the last gram of material placed on the pan. Or, in another embodiment shown in Figure 6 a nine-gram weight 45 could be balanced on the beam 21'' of the scale 11'' so that the plunger 20'' moving downward under the load would have to take up this nine-gram weight first before it could indicate the last gram.

If the sliding scale 28 were incorporated in such a device the dial could be read to one-tenth of one percent of moisture in the sand.

From the foregoing disclosure it is evident that there is provided in this invention a very simple means for accurately measuring the amount of moisture in a sample of sand or the like. All that is required in this mechanism is a sensitive small scale and a source of heat that may be positioned over the contents in the pan of the scale. It is evident that this apparatus is compact and could readily be set up in a foundry in any convenient corner without interfering with the normal operations on the foundry floor.

It will, of course, be understood that various details of construction may be varied through a

I claim:

In a device for measuring moisture content of a wet fungible mass, the combination comprising: a scale including a dial having graduations, a balance beam having an indicating pointer movable over said dial, a vertically reciprocable plunger operatively connected to said beam to deflect said pointer across said dial by a downward movement, and a platform carried atop said plunger; a shallow sample dish removably disposed on said platform and opening upwardly to receive radiant heat from above, a heat insulating pad interposed between said platform and said dish to prevent heat transfer to said scale, and a weight on said beam positioned to counterbalance a predetermined proportion of the mass in said sample dish which is required to deflect said indicating pointer fully across said dial, said dial graduations including a zero mark at the full scale deflection of said pointer and successively increasing values marked across said dial corresponding to the weight of the removed moisture.

ROBERT L. McILVAINE.

REFERENCES CITED

The following references are of record in the file of this patent:

UNITED STATES PATENTS

| Number | Name | Date |
|---|---|---|
| 1,356,287 | Jaenichen | Oct. 19, 1920 |
| 1,505,343 | Heath | Aug. 19, 1924 |
| 1,757,766 | Ferguson et al. | May 6, 1930 |
| 1,959,832 | Lesh | May 22, 1934 |
| 2,117,441 | McWeeny | May 17, 1938 |

FOREIGN PATENTS

| Number | Country | Date |
|---|---|---|
| 16,681 | Great Britain | 1913 |
| 266,628 | Great Britain | Mar. 3, 1927 |
| 321,243 | Germany | May 27, 1920 |
| 468,100 | Great Britain | June 29, 1937 |
| 700,167 | France | Feb. 22, 1930 |